United States Patent [19]
Li et al.

[11] Patent Number: 5,423,318
[45] Date of Patent: Jun. 13, 1995

[54] PHASE ABERRATION CORRECTIONS UTILIZING COLOR FLOW PROCESSORS

[75] Inventors: Ming Li, Seattle; Jin Kim, Issaquah, both of Wash.

[73] Assignee: Siemens Medical Systems, Inc., Iselin, N.J.

[21] Appl. No.: 264,545

[22] Filed: Jun. 23, 1994

[51] Int. Cl.$^6$ ................................................. A61B 8/00
[52] U.S. Cl. ................................................. 128/661.01
[58] Field of Search ................. 128/660.06, 660.07, 128/661.08, 661.09, 661.01, 662.01, 662.02; 364/413.25

[56] References Cited

U.S. PATENT DOCUMENTS

| 5,170,792 | 12/1992 | Sturgill et al. | 128/661.09 |
| 5,197,477 | 3/1993 | Peterson et al. | 128/662.01 |
| 5,215,094 | 6/1993 | Franklin et al. | 128/661.08 |

*Primary Examiner*—George Manuel
*Attorney, Agent, or Firm*—Michael B. Einschlag

[57] ABSTRACT

Apparatus for adaptive phase aberration correction of wave distortions caused by tissue inhomogeneities in ultrasound images. In accordance with the present invention, auto-correlation apparatus in multiple, parallel, color flow processors compute a cross-correlation which is used to correct distortions in real time.

12 Claims, 2 Drawing Sheets

PHASE ABERRATION CORRECTIONS UTILIZING COLOR FLOW PROCESSORS

TECHNICAL FIELD OF THE INVENTION

The present invention relates to adaptive correction of phase aberration in ultrasound images caused by inhomogeneities in tissue density and/or acoustic velocity using multiple, parallel, color flow processors.

BACKGROUND OF THE INVENTION

As is well known, phase aberration corrections (PAC) are applied in ultrasound imaging systems to correct phase errors in ultrasound beams which are caused by nearfield inhomogeneities in tissue density and/or in acoustic velocity. Ultrasound imaging applications in which such phase errors are most degrading include abdominal imaging of difficult patients, transcranial imaging, and breast imaging. Further, as is well known, the effects of such phase errors are more prominent when utilizing large aperture transducer arrays, high frequency imaging, and high precision beamforming with a large number of channels.

An assumption which is used by most commercial ultrasound scanners for all focusing and angle steering calculations is that the propagation velocity of ultrasound waves in human tissue is a constant (typically a value of 1540 m/s is used). Unfortunately, this assumption is not valid. In reality, a human body is comprised of inhomogeneous layers of different tissues, for example, fat, muscle, bone, and, so forth, with these layers having bumps and ridges of varying thicknesses, densities, and acoustic velocities. As a result, the propagation velocity of ultrasound waves in the human body varies from approximately 1470 m/s in fat, to greater than 1600 m/s in muscle and nervous tissue, to as much as 3700 m/s in bone. Using the assumption that the human body is comprised of a uniform tissue medium of constant propagation velocity, the presence of inhomogeneous tissue layers results in image artifacts, range shifts, geometric distortions, broadening of transducer beam patterns which degrade ideal diffraction limited lateral resolution, and increased side lobes which reduce contrast resolution in an image. Most approaches used to make phase aberration correction, utilize dedicated hardware which results in an expensive solution.

In light of the above, there is a need in the art for apparatus for performing adaptive phase aberration correction which is less expensive than prior apparatus.

SUMMARY OF THE INVENTION

Advantageously, embodiments of the present invention solve the above-identified need in the art by providing an apparatus for performing adaptive phase aberration correction which is less expensive than prior apparatus. An embodiment of the present invention is an ultrasound imaging apparatus for transmitting ultrasound signals to a subject to be diagnosed and for constructing an image from received ultrasound echo signals, the apparatus providing phase aberration correction of wave distortions in the subject, the ultrasound imaging apparatus comprising: (a) a transducer array comprised of transducer elements for converting electrical driving signals supplied thereto into the ultrasound signals and for converting the received ultrasound echo signals into electrical echo signals; (b) means for generating and supplying the electrical driving signals to the transducer elements; (c) means for forming pairs of beamformer channels from the electrical echo signals received from transducer elements for a region of interest, each pair comprised of a reference beamformer channel formed from electrical echo signals produced by a group of reference transducer elements and a correction beamformer channel formed from electrical echo signals produced by a group of correction transducer elements; (d) means for applying the pairs of beamformer channels in parallel to color flow processors having auto-correlation apparatus; and (e) means, in response to the output from the color flow processor auto-correlation apparatus, for determining phase-corrected time delay values and for applying the phase-corrected time delay values as input to the means for forming pairs of beamformer channels.

DETAILED DESCRIPTION

Figure 1:
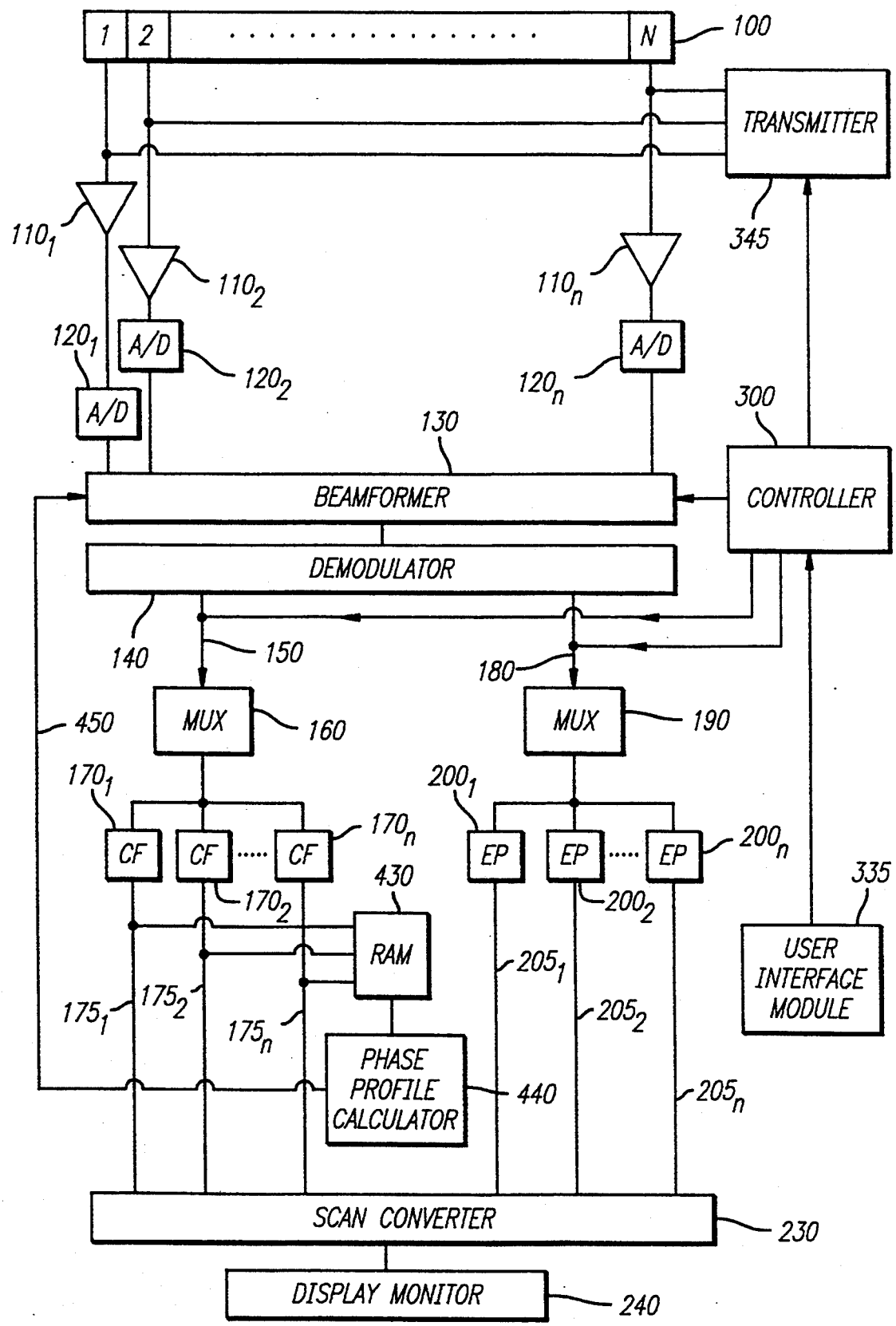
FIG. 1 shows a block diagram of a portion of an ultrasound imaging system which is fabricated in accordance with the present invention.

FIG. 1 shows a block diagram of a portion of an ultrasound imaging system which is fabricated in accordance with the present invention. First, a description will be provided of color flow ultrasound imaging without adaptive phase aberration correction. In this case, output from transmitter 335 is applied to transducer array 100 to generate a transmit beam in accordance with methods which are well known in the art. Transducer array 100 detects echoes and outputs receive signals in accordance with methods which are well known in the art. As shown in FIG. 1, transducer array 100 is comprised of N transducer elements.

As is known, the receive signals output from transducer elements 1-N are applied as input to amplifiers $110_1$–$110_N$. Amplifiers $110_1$–$110_N$ amplify the receive signals and the amplified signals output from amplifiers $110_1$–$110_N$ are applied as input analog-to-digital converters $120_1$–$120_N$. Analog-to-digital converters $120_1$–$120_N$ convert the amplified signals to digital signals. The digital signals output from analog-to-digital converters $120_1$–$120_N$ are applied as input to beamformer 130. Beamformer 130, in response to instructions received from controller 300: (a) groups the digital signals into beamlines and (b) applies appropriate time delays and amplitude apodizations to the beamlines in accordance with methods which are known in the art to produce beamformed signals. In accordance with nomenclature which is well known in the art, the outputs from beamformer 130 are referred to as range-gated beamformer channels. Next, the beamformed signals output from beamformer 130 are applied as input to demodulator 140. As is well known, demodulator 140 outputs I and Q signals, i.e., in-phase and quadrature signals, over leads 150, which I and Q signals are applied as input to multiplexor 160. Multiplexor 160, in response to instructions received from controller 300, applies the I and Q signals received from demodulator 140 over leads 150, as input to color flow processors $170_1$–$170_n$. The color flow processors extract color flow information from the I and Q signals in a manner which is well known.

As is well known, demodulator 140 also outputs envelope-detected-signals over leads 180, which envelope-detected-signals are applied as input to multiplexor 190. Multiplexor 190, in response to instructions received from controller 300, applies the envelope-detected-signals received from demodulator 140 over leads 180, as input to echo processors $200_1$–$200_m$. The echo processors extract B-mode image information from the envelope-detected signals in a manner which is well known. Color-flow-processed signals are output from color flow processors $170_1$–$170_n$ over leads $175_1$–$175_n$ and are applied as input to scan converter 230. In addition, echo-processed signals are output from echo processors $200_1$–$200_m$ over leads $205_1$–$205_m$ and are applied as input to scan converter 230. Scan converter 230 merges and scan-converts the inputs from the color flow processors and from the echo processors and outputs image data for display on display monitor 240.

The manner in which the apparatus shown in FIG. 1 operates to provide adaptive phase aberration correction (PAC) will be described in detail below. In accordance with the inventive method, the inventive PAC mode of operation may be interleaved completely with normal imaging (this a method where a PAC mode of operation is completed before returning to an imaging mode of operation) or the inventive PAC mode of operation may be interleaved on a partial basis with normal imaging (this is a method where a partial PAC mode of operation is initiated and then halted, the normal imaging mode of operation is continued and then halted, and the PAC mode of operation is resumed and completed). It should be understood that embodiments of the present invention operate in either or both of these modes and a decision as to which of these modes is used in a particular case may be left to the user. For example, the user may enter an option into the imaging system by way of a user-machine interface 335 in a manner which is well known to those of ordinary skill in the art. Then, in accordance with methods which are well known in the art, information is transferred from user interface module 335 to controller 300 to effectuate the mode requested by the user.

Figure 2:
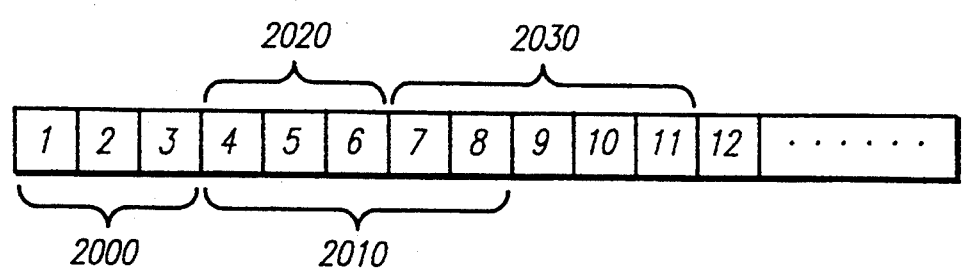
FIG. 2 shows a transducer array and grouping of transducer elements in accordance with the present invention.

In accordance with the inventive PAC mode of operation, multiple, parallel beamlines are formed by beamformer 130 for each transmit beam in response to instructions received from controller 300. These beamlines are formed, for example, on beamformer channels $A_1, A_2, \ldots, A_q$ (where q is a parameter which can be user defined by input in light of experience with the inventive method), and the beamlines are comprised of signals from v different adjacent transducer elements or groups of transducer elements. FIG. 2 shows a transducer array and a grouping of transducer elements in accordance with the present invention. As shown in FIG. 2, group 2000 is comprised of transducer elements 1, 2, and 3 and group 2000 is a group of transducer elements whose phase is to be corrected. As further shown in FIG. 2, group 2010 is comprised of transducer elements 4, 5, 6, 7, and 8 and group 2010 is a group of transducer elements which is used as a reference for the correction. To provide a phase correction for transducer elements 4, 5, and 6 one would utilize a group comprised of transducer elements 7, 8, 9, 10, 11, and 12. In this case, to provide phase correction: (a) for group 2000, beamformer 130 forms a beamline for group 2000 as beamformer channel $A_1$ and a beamline for group 2010 as beamformer channel $A_2$; (b) for group 2020, beamformer 130 forms a beamline for group 2020 as beamformer channel $A_3$ and a beamline; for group 2030 as beamformer channel $A_4$; (c) and so forth.

Figure 3:
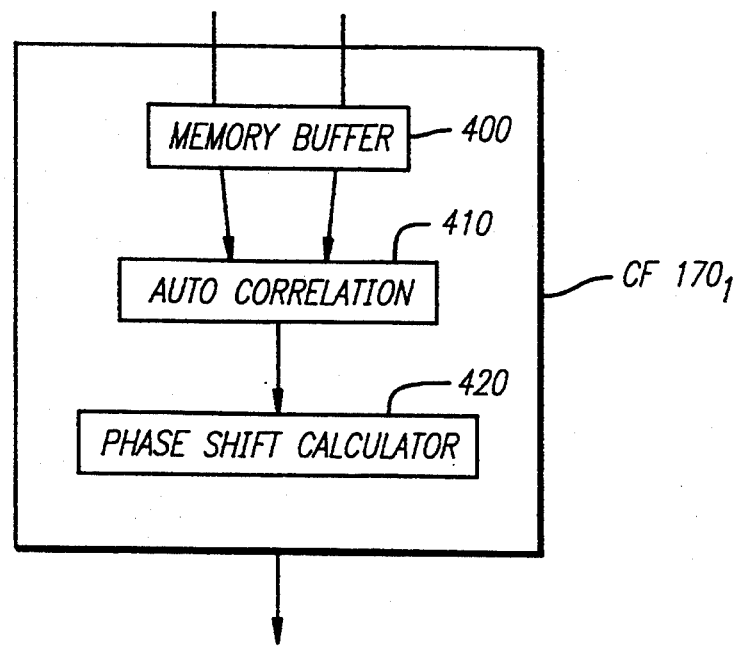
FIG. 3 shows a block diagram of a portion of a color flow processor which is fabricated in accordance with the present invention.

FIG. 3 shows a block diagram of a portion of a color flow processor which is fabricated in accordance with the present invention. In the PAC mode of operation, after a transmit beam is generated, multiple receive beamformer channels produced by beamformer 130 are passed to memory buffer 400 in color flow processors $170_1$–$170_n$ by multiplexor 160. If the number of transducer elements in a group to be corrected and in a group used as a reference is the same, the receive beamformer channels are applied to the color flow processors in the following fashion: (a) beamformer channels $A_1$ and $A_2$ are applied as input to the first color flow processor, i.e., CF $170_1$: (b) beams $A_2$ and $A_3$ go to the second color flow processor, i.e., CF $170_2$; and so forth. However, if the number of transducer elements in a group to be corrected and in a group used as a reference is not the same, then the beamformer channels which are applied as input to the color flow processors must be paired so that the beamformer channels formed by beamformer 130 correspond to the selected groups. For example, for the situation described above with respect to FIG. 2, the receive beamformer channels are applied to the color flow processors in the following fashion: (a) beamformer channels $A_1$ and $A_2$ are applied as input to the first color flow processor, i.e., CF $170_1$: (b) beams $A_3$ and $A_4$ go to the second color flow processor, i.e., CF $170_2$; and so forth.

For each pair of beamformer channels applied as input to a color processor, while the first beamformer channel is sent directly to auto-correlation apparatus 410, the second beamformer channel is temporarily stored in memory buffer 400 before being sent to auto-correlation apparatus 410. Auto-correlation apparatus 410 then performs a correlation operation using the data from first and second beamformer channels. As one can readily appreciate, due to the input, this correlation operation becomes a cross-correlation operation.

The output from auto-correlation apparatus 410 is applied as input to phase shift calculator 420 to obtain the relative phase shift between the two beams and the magnitude of the cross-correlation for use, in accordance with a further aspect of the present invention, in detecting and compensating for dead, weak, or blocked transducer elements in a manner which is explained in detail below. The output from phase shift calculator 420 is applied as input to storage 430, for example, RAM 430, until similar calculations have been performed on all adjacent pairs of elements or groups of elements in the transducer array. The outputs from the color flow processors, in response to instructions received from controller 300, are applied as input to scan converter 230 in the imaging mode of operation or are applied as input to RAM 430 in the PAC mode of operation.

Upon completion of the correlation sequence for all element groups in the transducer array, the relative phase shift and dead element information provided by the color flow processors are output from RAM 430 and applied as input to phase profile calculator 440. Phase profile calculator 440 constructs absolute phase shifts and a final phase correction time delay profile of phase corrected time delay values which removes a linear or planar time shift component that may occur. Phase profile constructor 440 may also perform any required calculations such as, for example, interpolation, FFT, low-pass filtering, and so forth. The phase correction time delay values, in response to instructions received from controller 300, are applied over leads 450 as input to beamformer 130 for use in the imaging mode of operation.

The following describes the inventive adaptive cross-correlation algorithm. As described above, a color flow processor will obtain two range-gated complex vectors corresponding to a pair of receive beamformer channels to perform a cross-correlation using its auto-correlation apparatus. One of the vectors, defined as $S_c$, is formed by a group of transducer elements whose relative phase shifts are to be calculated and other vector, defined as $S_r$, is formed by an adjacent group of transducer elements and acts as a reference signal for calculating the relative phase shifts of the first group.

$$S_c(k) = \sum_{j=bc}^{j=bc+nc-1} S_j(k) \tag{1}$$

The sum in eqn. (1) is over transducer element j which runs from bc to (bc+nc−1), where bc is the first transducer element of a correcting transducer element group, nc represents the number of elements in the correcting transducer element group (nc is determined empirically to provide the best improved image and can be set by user input), and k is an index of sample points (k=0 corresponds to a sample point at the beginning of a selected region of interest (ROI) and k=ns−1 corresponds to a sample point at the end of the ROI).

$$S_r(k) = \sum_{l=br}^{l=br+nr-1} S_l(k) \tag{2}$$

The sum in eqn. (2) is over transducer element l which runs from br to (br+nr−1), where br is the first transducer element of a reference transducer element group, nr represents the number of elements in the reference group (nr is determined empirically to provide the best improved image and can be set by user input). As before, k is an index of sample points in the ROI.

Prior to performing the complex cross-correlation, $S_c$ and $S_r$ are normalized as follows:

$$S_{cn} = S_c * N/nc \text{ and } S_{rn} = S_r * N/nr \tag{3}$$

where N is the number of transducer elements in transducer array 100. Then, the normalized values $S_{cn}(k)$ and $S_{rn}(k)$ are represented as follows:

$$S_{cn}(k) = A_{cn}(k)e^{i\phi(k)} = I_{cn}(k) + Q_{cn}(k) \tag{4}$$

$$S_{rn}(k) = A_{rn}(k)e^{i\phi(k)} = I_{rn}(k) + Q_{rn}(k) \tag{5}$$

The cross-correlation is given by:

$$C(j) = \sum_k S_{rn}(k) * S^*_{cn}(k+j) = RE(j) + iIM(j) \tag{6}$$

where:

$$RE(j) = \sum_k RE(S_{rn}(k) * S^*_{cn}(k+j)) \tag{7}$$
$$= \sum_k (I_{cn}(k) * I_{rn}(k+j) + Q_{cn}(k) * Q_{rn}(k+j))$$

$$IM(j) = \sum_k IM(S_{rn}(k) * S^*_{cn}(k+j)) \tag{8}$$
$$= \sum_k (Q_{cn}(k) * I_{rn}(k+j) - I_{cn}(k) * Q_{rn}(k+j))$$

and the sums are over k, i.e., the sample points. RE(j) and IM(j) are applied as input to phase shift calculator 420.

The phase shift $\Delta\phi$ is computed from the complex cross-correlation C(j) in phase shift calculator 420 as follows:

$$\Delta\phi = \tan^{-1}[IM(0)/RE(0)] \tag{9}$$

Then, using the phase shift, the relative time delay is obtained as follows:

$$\Delta t = \Delta\phi/\omega_o \tag{10}$$

where $\omega_o$ is the carrier frequency, i.e., the nominal center frequency of a transducer element. The calculated values of $\Delta t$ are rounded off to the smallest time delay quantization.

Starting from one end of transducer 100, for each adjacent pair of $S_c$ and $S_r$, relative time delay $\Delta t$ is obtained as follows:

$$\begin{aligned}
\Delta t_1 &<=> (S_{c1} \text{ and } S_{r1}) \\
\Delta t_2 &<=> (S_{c2} \text{ and } S_{r2}) \\
\Delta t_3 &<=> (S_{c2} \text{ and } S_{r3}) \\
\Delta t_4 &<=> (S_{c4} \text{ and } S_{r4}) \\
&\ldots \\
\Delta t_{(N/nc-1)} &<=> (S_{(N/nc-1)} \text{ and } S_{(N/nc-1)})
\end{aligned} \tag{11}$$

The relative time delays from each of the phase shift calculators in the color flow processors are applied as input to RAM 430. Then, the relative time delays are applied as input to phase profile constructor 440. Phase profile constructor 440 obtains the absolute time delays by selecting the group of elements at the end of the transducer as the reference point so that:

$$t_1 = 0$$
$$t_2 = \Delta t_1$$
$$t_3 = \Delta t_1 + \Delta t_2$$
$$t_4 = \Delta t_1 + \Delta t_2 + \Delta t_3$$
$$t_5 = \Delta t_1 + \Delta t_2 + \Delta t_3 + \Delta t_4 \tag{12}$$

The final time delays, i.e., the time delays which are used to update transmit and receive time delays in beamformer 130, are obtained after removing an unwanted linear, i.e., steering component. The simplest way of removing the linear component is given by the following:

$$t_1' = t_1 - nc\left(\sum_k \Delta t_k\right)/(N/nc - 1) \tag{13}$$
$$t_2' = t_2 - 2nc\left(\sum_k \Delta t_k\right)/(N/nc - 1)$$
$$t_3' = t_3 - 3nc\left(\sum_k \Delta t_k\right)/(N/nc - 1)$$
$$\ldots$$

-continued $$t_i' = t_i - i\,nc\left(\sum_k \Delta t_k\right)/(N/nc - 1)$$

...

A more complex method of removing the linear component is to minimize the least square error and is given as follows:

$$t_k' = t_k - k * \text{beta} \quad (14)$$

and $$\text{beta} = \frac{\left(\sum_k (k - \text{mean}\_k)*(t_k - \text{mean}\_t)\right)}{\left(\sum_k (k - \text{mean}\_k)*(k - \text{mean}\_k)\right)} \quad (15)$$

$$\text{mean}\_k = (\sum_k (k)/(N/nc - 1) \quad (16)$$

$$\text{mean}\_t = (\sum_k (t_k)(N/nc - 1)$$

The set of $t_i'$ can be interpolated for instance using a polynomial spline method to obtain the time shift for each array element rather than just for each group of elements. Then, the set of $t_{k'}$ are applied over leads 450 as input to beamformer 130 to provide the phase aberration correction.

As is known, phase aberration correction is an iterative process. In accordance with the present invention, iteration will stop when a user definable number of iterations, for example, 2 or 3, is reached or when a root-mean-square sum, or like error indication function, of phase errors which is determined in phase profile calculator 440 is less than or equal to a user definable threshold value. The value of the number of iterations or threshold is expected to be determined in practice by indication of image improvement and processing time involved.

As is well known, some elements of a transducer array may be dead, i.e., inoperable or operating a deteriorated fashion, or some may be blocked, i.e., the beams may be obscured for example, by a bone. In accordance with a further aspect of the present invention, an operation for compensating possible dead or blocked elements is provided in accordance with the following. First, the amplitude of the cross-correlation between two beams k and k+1 is computed in phase shift calculator 420 as follows:

$$A(k,k+1) = (IM(O)*IM(O)RE(O)*RE(O))_{k,k+1} \quad (17)$$

Phase profile constructor 440 determines that transducer element k+1 is dead or weak if $A(k,k+1) \leq \epsilon$, a predetermined small quantity, but $A(k-1,k) \geq \alpha$, a predetermined, typical amplitude, and if $A(k+1,k+2) \leq \epsilon$, $A(k+2,k+3) \geq \alpha$. If this is the case, phase profile constructor 440 sends a signal to controller 300 to cause it to have beamformer 130 skip transducer element k+1 in forming groups of transducer elements for phase aberration correction. Consequently, the complex cross-correlation for purposes of phase aberration correction is performed between the kth and the (k+2)th beams instead of between the kth and the (k+1)th beams, and so forth. Of course, in comparing the amplitude of the cross-correlation to be larger than $\alpha$, one may utilize any pair of beamformer channels because there may be more than one dead or blocked adjacent elements. There is a need to provide a time delay to beamformer 130 for the missing or blocked elements for purposes of imaging. In accordance with the present invention, the time shifts for the missing or blocked elements can be evenly distributed. For example, if elements 2 and 3 are missing, then:

$$\Delta t_1 = \Delta t_2 = \Delta t_3 = \tfrac{1}{3}(\Delta t_{1\text{-}4}) \quad (18)$$

where ($\Delta t_{1\text{-}4}$) is the relative time delay between beams 1 and 4.

Although various minor modifications may be suggested by those versed in the art, it should be understood that we wish to embody within the scope of the patent granted hereon all such modification as reasonably and properly come within the scope of our contribution to the art.

What is claimed is:

1. An ultrasound imaging apparatus for transmitting ultrasound signals to a subject to be diagnosed and for constructing an image from received ultrasound echo signals, the apparatus providing phase aberration correction of wave distortions in the subject, the ultrasound imaging apparatus comprising:

a transducer array comprised of transducer elements for converting electrical driving signals supplied thereto into the ultrasound signals and for converting the received ultrasound echo signals into electrical echo signals;

means for generating and supplying the electrical driving signals to the transducer elements;

means for forming pairs of beamformer channels from the electrical echo signals received from transducer elements for a region of interest, each pair comprised of a reference beamformer channel formed from electrical echo signals produced by a group of reference transducer elements and a correction beamformer channel formed from electrical echo signals produced by a group of correction transducer elements;

means for applying the pairs of beamformer channels in parallel to color flow processors having auto-correlation apparatus to produce a cross-correlation of the pairs; and means, in response to the output from the color flow processor auto-correlation apparatus, for determining phase-corrected time delay values and for applying the phase-corrected time delay values as input to the means for forming pairs of beamformer channels.

2. The ultrasound imaging apparatus of claim 1 wherein the number of elements in the group of reference transducer elements is different from the number of elements in the group of correction transducer elements.

3. The ultrasound imaging apparatus of claim 2 which further comprises user interaction means for receiving user input which provides the number of elements in the group of reference transducer elements and the number of elements in the group of correction transducer elements.

4. The ultrasound imaging apparatus of claim 2 wherein the means for determining phase-corrected time delay values comprises means for determining corrected time delay values for each group of reference transducer elements and means, responsive to the corrected time delay values for each group, for interpolating to determine phase corrected time delay values for each array element.

5. The ultrasound apparatus of claim 4 wherein the means for interpolating comprises means for polynomial spline interpolating.

6. The ultrasound imaging apparatus of claim 1 wherein the means for determining phase-corrected time delay values comprises means for determining a phase aberration correction error indication.

7. The ultrasound imaging apparatus of claim 6 which further comprises user interaction means for receiving user input which provides a phase aberration correction threshold for comparison with the phase aberration correction error indication.

8. The ultrasound imaging apparatus of claim 1 wherein the means for determining phase-corrected time delay values comprises means for removing a linear steering component.

9. The ultrasound imaging apparatus of claim 8 wherein the means for removing a linear steering component comprises means for minimizing least square error.

10. The ultrasound imaging apparatus of claim 1 wherein the means for determining phase-corrected time delay values further comprises means for compensating dead or blocked elements.

11. The ultrasound imaging apparatus of claim 10 wherein the compensating means comprises means for comparing an amplitude of the cross-correlation of a first pair of beamformer channels with a first threshold and an amplitude of the cross-correlation of a second pair of beamformer channels with the first threshold, the first pair and the second pair of beamformer channels including a beamformer channel formed from electrical echo signals received from common transducer elements and means for comparing an amplitude of the cross-correlation of at least a third pair of beamformer channels with a second threshold.

12. The ultrasound imaging apparatus of claim 11 which further comprises user interaction means for receiving user input which provides the first and second thresholds.

* * * * *